(12) United States Patent
Wadley et al.

(10) Patent No.: US 7,211,348 B2
(45) Date of Patent: May 1, 2007

(54) MULTIFUNCTIONAL BATTERY AND METHOD OF MAKING THE SAME

(75) Inventors: Haydn N. G. Wadley, Keswick, VA (US); Douglas T. Queheillalt, Charlottesville, VA (US); Anthony G. Evans, Princeton, NJ (US); Ann Marie Sastry, Ann Arbor, MI (US)

(73) Assignee: University of Virginia Patent Foundation, Charlottesville, VA (US)

( * ) Notice: Subject to any disclaimer, the term of this patent is extended or adjusted under 35 U.S.C. 154(b) by 153 days.

(21) Appl. No.: 10/110,368

(22) PCT Filed: Aug. 10, 2001

(86) PCT No.: PCT/US01/25158

§ 371 (c)(1),
(2), (4) Date: Jul. 22, 2002

(87) PCT Pub. No.: WO02/15300

PCT Pub. Date: Feb. 21, 2002

(65) Prior Publication Data

US 2003/0049537 A1    Mar. 13, 2003

Related U.S. Application Data

(60) Provisional application No. 60/224,453, filed on Aug. 10, 2000.

(51) Int. Cl.
*H01M 4/04* (2006.01)
*H01M 4/70* (2006.01)
*H01M 4/75* (2006.01)

(52) U.S. Cl. .......................... 429/208; 429/9; 429/152; 429/218.2

(58) Field of Classification Search .................... 429/9, 429/31, 66, 44, 158, 159, 96–100, 128, 151, 429/208, 218.2
See application file for complete search history.

(56) References Cited

U.S. PATENT DOCUMENTS

| 3,607,403 A | 9/1971 | Arrance |
|---|---|---|
| 3,661,644 A | 5/1972 | Arrance |
| 4,160,068 A | 7/1979 | Kummer |
| 4,447,504 A | 5/1984 | Goebel |

(Continued)

OTHER PUBLICATIONS

Queheillalt, "Electron Beam —Directed Vapor Deposition of Multifunctional Structures," Mat. Res. Soc. Symp. Proc., (2001).

*Primary Examiner*—Tracy Dove
(74) *Attorney, Agent, or Firm*—Robert J. Decker

(57) ABSTRACT

Disclosed herein is a multifunctional battery for supplying power to an electrical circuit, and the related method of making the same. Use of the multifunctional battery permits structural integrity and versatility, while maximizing power output of the cells and minimizing the overall weight of the structure. The multifunctional battery includes an open cell interconnected structure comprised of a plurality of open cells so as to provide a structural electrode. The structural electrode is configured to be a load bearing member. The battery also includes interstitial electrodes that are counter electrodes to the structural electrode. The interstitial electrodes are at least partially received within a predetermined number of the cells of the interconnected structure. Additionally, a separator portion is disposed between the structural electrode and interstitial electrodes to serve as an electrical insulator.

38 Claims, 12 Drawing Sheets

U.S. PATENT DOCUMENTS

| | | |
|---|---|---|
| 4,623,597 A | 11/1986 | Sapru |
| 4,906,536 A | 3/1990 | Simonton |
| 5,449,574 A | 9/1995 | Higley |
| 5,468,569 A | 11/1995 | Pyszczek |
| 5,484,461 A | 1/1996 | Rothman |
| 5,534,314 A | 7/1996 | Wadley |
| 5,567,544 A | 10/1996 | Lyman |
| 5,631,102 A | 5/1997 | Spillman |
| 5,656,388 A | 8/1997 | Bugga |
| 5,793,603 A | 8/1998 | Lyman |
| 5,856,047 A | 1/1999 | Venkatesan |
| 5,888,665 A | 3/1999 | Bugga |
| 5,916,706 A | 6/1999 | Berkey |
| 6,010,543 A | 1/2000 | Berkey |
| 6,261,717 B1 * | 7/2001 | Luo et al. ............. 429/164 |
| 6,555,945 B1 * | 4/2003 | Baughman et al. ......... 310/300 |

* cited by examiner

MULTIFUNCTIONAL BATTERY AND METHOD OF MAKING THE SAME

RELATED APPLICATIONS

This application is a national stage filing of International Application Ser. No. PCT/US01/25158, filed on Aug. 10, 2001, which claims benefit under 35 U.S.C. Section 119(e) from U.S. Provisional Application Ser. No. 60/224,453, filed on Aug. 10, 2000, entitled "Multifunctional Electrochemical Energy Storage Materials and Method of Producing the Same," the entire disclosures of which are hereby incorporated by reference herein in their entirety.

GOVERNMENT SUPPORT

Work described herein was supported by Federal Grant Number N00014-96-I-1028, awarded by the Office of Naval Research. The United States Government possesses certain rights in and to this invention.

FIELD OF INVENTION

This invention relates to an improved design for an electrochemical battery and related method of producing the same, and more particularly a battery having multifunctional structures that combine significant load-bearing support in addition to electrochemical energy storage.

BACKGROUND OF INVENTION

In general, a battery is a device that converts the chemical energy contained in its active materials directly into electric energy by means of an electrochemical oxidation-reduction (redox) reaction. This type of reaction involves the transfer of electrons from one material to another through an electric circuit.

While the term "battery" is often used, the basic electrochemical unit being referred to is the "cell" (not to be confused with a structural cell, to be discussed below). A battery comprises one or more of these battery cells, connected in series or parallel, or both, depending on the desired output voltage and capacity.

The battery cell comprises three major components: anode or negative electrode; cathode or positive electrode; and the electrolyte. The anode—the reducing or fuel electrode—gives up electrons to the external circuit and is oxidized during the electrochemical reaction. The cathode or positive electrode—the oxidizing electrode—accepts electrons from the external circuit and is reduced during the electrochemical reaction. The electrolyte—the ionic conductor—provides the medium for transfer of electrons as ions, inside the cell between the anode and cathode. The electrolyte is typically a liquid, such as water or other solvent, with dissolved salts, acids, or alkalis to impart ionic conductivity. Some batteries use solid electrolytes, which are ionic conductors at the operating temperature of a cell (See D. Linden, "Handbook of Batteries," $2^{nd}$ edition, McGraw-Hill, Inc., New York, (1995), of which is hereby incorporated by reference herein). Other batteries are disclosed in U.S. Pat. Nos. 6,010,543 and U.S. Pat. No. 5,916,706 to Berkey et al. and No. 4,160,068 to Kummer; all of which are incorporated by reference herein.

Physically the anode and cathode electrodes are electronically isolated in the cell to prevent internal short-circuiting, but are surrounded by the electrolyte. In practical cell designs a separator material is used to separate the anode and cathode electrodes mechanically. The separator, however, is permeable to the electrolyte in order to maintain design. Electrically conducting grid structures or materials may also be added to the electrodes to reduce internal resistance.

The battery cell configurations typically have included—cylindrical, button, flat, and prismatic—and the cell components are designed to accommodate the particular cell shape. The cells are sealed in a variety of ways to prevent leakage and dry-out. Some cells are provided with venting devices or other means to allow accumulated gases to escape. Suitable cell cases or containers and means for terminal connection are added to complete the cell.

FIG. 1A schematically shows the operation of a battery cell 1 during discharge. When the cell 1 is connected to an external load, electrons flow from the anode 6, which is oxidized, thought the external load to the cathode 8, where the electrons are accepted and the cathode material is reduced. The electric circuit 9 is completed in the electrolyte 12 by the flow of anions (negative ions) and cations (positive ion) to the anode 6 and cathode 8, respectively. The battery may include a casing 2, which can be hermetically sealed and/or can include a vent 4. A separator 10 separates the anode 6 and cathode 8. The electrolyte may be an aqueous solution consisting of mainly potassium hydroxide (KOH).

As shown in FIG. 1B, during the recharge of a rechargeable or storage battery 1, the current flow is reversed and oxidation takes place at the positive electrode and reduction at the negative electrode. As the anode is, by definition, the electrode at which oxidation occurs and the cathode the one where reduction takes place, the positive electrode is now the anode and the negative is the cathode during recharge.

With regards to the present invention, the rechargeable sealed nickel-metal hydride battery is a relatively new technology with characteristics similar to those of the sealed nickel-cadmium battery. The principal difference is that the nickel-metal hydride battery uses hydrogen, absorbed in a metal alloy, for the active negative material in place of the cadmium used in the nickel-cadmium battery.

The metal hydride electrode has a higher energy density than the cadmium electrode. Therefore, the amount of the negative electrode used in the nickel-metal hydride cell can be less than that used in the nickel-cadmium cell. This allows for a larger volume for the positive electrode, which results in a higher capacity or longer service life for the metal hydride battery. Furthermore, as the nickel-metal hydride battery is free of cadmium, it is considered more environmentally friendly than the nickel-cadmium battery and may reduce the problems associated with the disposal of rechargeable nickel batteries.

The sealed nickel-metal hydride battery is often preferred compared with the sealed nickel cadmium cell for use in computers, cellular phones, and other portable and consumer electronics applications where the higher specific energy is desired. The metal hydride battery in larger sizes is also utilized for use in applications such as electric vehicles, where its higher specific energy and good cycle life approach critical performance requirements.

The active metal of the positive electrode (cathode) of the nickel-metal hydride battery, in the charged state, is nickel oxyhydroxide (NiOOH). This is the same as the positive electrode in the nickel-cadmium battery.

The negative (anode) active material, in the charged state is hydrogen in the form of a metal hydride W). This metal alloy is capable of undergoing a reversible hydrogen absorbing-desorbing reaction as the battery is charged and discharged.

An aqueous solution of potassium hydroxide KOH) is the major component of the electrolyte. A minimum amount of electrolyte is used in this sealed cell design, with most of the liquid absorbed by the separator and the electrodes. This "starved-electrolyte" design, similar to the one in sealed nickel-cadmium batteries, facilitates the diffusion of oxygen to the negative electrode at the end of the charge for the oxygen-recombination reaction. This is essentially a dry-cell construction, and the cell is capable of operating in any position.

During discharge, the nickel oxyhydroxide (NiOOH) is reduced to nickel hydroxide (Ni(OH)$_2$), $$NiOOH+H_2O+e \rightarrow Ni(OH)_2+OH^-$$

and the metal hydride (MH) is oxidized to the metal alloy M, $$MH+OH^- \rightarrow M+H_2O+e$$

The overall reaction on discharge is $$MH+NiOOH \rightarrow M+Ni(OH)_2$$

The process is reversed during charge.

Two types of metallic alloys are generally used for the negative electrode (anode). These are the rare-earth (Misch metal) alloys based around lanthanum nickel, known as the $AB_5$ class of alloys, and alloys consisting of titanium and zirconium, known as the $AB_2$ class of alloys. In both cases, some of the base metals are replaced with other metals to achieve the desired characteristics.

The $AB_5$ alloys are essentially based on LaNi$_5$, with various substituents for lanthanum and nickel to stabilize the alloy during charge/discharge cycling by reducing the internal absorption and/or forming protective surface films. For example, the volume expansion is reduced by a partial substitution of Ni with Co and the interfacial properties improved with small amounts of Al or Si. The cycle life improves upon the substitution of Ni with the ternary solute in the order Mn<Ni<Cu<Cr<Al<Co. A substitution of the rare-earth metal site with Ti, Zr, or other lanthanides such as Nd and Ce render the formation of a protective surface film and enhance the cycle life. This eventually led to the use of relatively inexpensive mish metal, Mm, a naturally occurring mixture of rare-earth metals (mainly La, Ce, Pr, and Nd) in place of La. The use of misch metal also improved the durability of the alloy, as evident from the long cycle life as well as the quantitative estimates of the surface layers [La(OH)$_3$ and Mm(OH)$_3$] on the cycled electrodes.

The $AB_2$ alloys have been improved by using vanadium-titanium-zirconium-nickel based alloys.

Sealed nickel-metal hydride cells are constructed in cylindrical, button, and prismatic configurations, similar to those used for the sealed nickel-cadmium battery.

With regards to construction, the electrodes are designed with highly porous structures having a large surface area to provide a low internal resistance and a capability for high-rate performance. The positive electrode in the cylindrical nickel-metal hydride cell is a highly porous sintered, or felt nickel substrate into which the nickel compounds are impregnated or pasted and converted into active material by electrodeposition. The negative electrode, similarly, is a highly porous structure using a perforated nickel foil or grid onto which the plastic-bonded active hydrogen storage alloy is coated. The electrodes are separated with a synthetic nonwoven material, which serves as an insulator between the two electrodes and as a medium for absorbing the electrolyte.

With regards to the electrical aspects, the NiMH battery produces a nominal voltage of about 1.2–1.3 volts. The total voltage of the battery system can be provided in multiples of this voltage by providing battery cells in series with each other. For example, placing ten such battery cells in series would provide a battery voltage of about 12 to 13 volts. The voltage of the electrochemical reaction is affected by ambient temperature. The effect on voltage is a function of the temperature in degrees Kelvin to a multiple power. Thus, across typical atmospheric temperature variations, the voltage does not vary radically. Further, as the temperature becomes too high the increased benefits from increased voltage from the reaction are offset by the problem of excessive chemical corrosion of the battery components.

The total battery capacity or energy density is dependent on the amount of active metal in the cathodes and anodes. In other words, how many active metal molecules are available to give up an electron.

For redundancy purposes and in order to prevent failed battery cells which are connected in parallel to other battery cells from adversely affecting those battery cells, diodes, circuit breakers and relays can be used to control and prevent short circuiting in one circuit from adversely effecting an adjacent parallel circuit.

The total surface area or amount of reagent determines the current produced by the battery system in the battery system. Thus, for a given battery cell size, the current produced by the battery system can be increased by placing additional battery cells in parallel with each other. The current is also a function of the spacing between the anode and cathode. The current within a given battery cell is governed by the availability of ions from the electrolyte at the surfaces of the electrodes. This, in turn is governed by the distance ions must drift through the electrolyte to cross the separator. With this design, the spacing is smaller, due to the smaller effects of material expansion as cited earlier. Higher charge and discharge currents may be achieved.

U.S. Pat. No. 5,567,544 to Lyman discloses a battery having an anode, a cathode, and a separator formed into a honeycomb structure; of which is hereby incorporated by reference in its entirety. While the Lyman battery & structure is compatible to fit into various linear like frames it fails to provide the structural integrity, strength, design flexibility, and fabrication simplification of the present invention battery, or related method of making the same.

There is therefore a need in the art for an effective battery, and method of producing the same, having multifunctional structures that combine significant load bearing support in addition to electrochemical energy storage.

SUMMARY OF THE INVENTION

One of the most important parameters of a battery system relates to the energy density of the battery system (as used herein, energy density is the total available energy per unit of mass). The present invention provides an improved design for an electrochemical battery and related method of producing the same, and more particularly a battery having multifunctional structures that combine superior load bearing support in addition to electrochemical energy storage. The present invention disclosed herein applies to rechargeable and primary batteries. Moreover, the present invention applies to nickel-metal hydride cells, lithium cells, and other battery technologies known to those skilled in the art.

In one aspect, the present invention features a multifunctional battery for supplying power to an electrical circuit having a first terminal and a second terminal. The battery comprising: an open cell interconnected structure comprised of a plurality of open cells, wherein the structure comprises a structural electrode, the multifunctional structure being configured to be a load bearing member and being connectable to the first terminal; at least one or a plurality of interstitial electrodes, the one or plurality of interstitial electrodes being a counter electrode to the structural electrode, the one or plurality of interstitial electrodes being at least partially received within a predetermined number of cells of the structure and being connectable to the second terminal; and a separator portion disposed between the structural electrode and the interstitial electrodes to serve as an electrical insulator between the structural electrode and interstitial electrodes.

In a second aspect, the present invention provides a method of producing a multifunctional battery for supplying power to an electrical circuit having a first terminal and a second terminal. The battery comprising: providing an open cell interconnected structure comprised of a plurality of open cells, wherein the structure comprises a structural electrode, the multifunctional structure being configured to be a load bearing member and being connectable to the first terminal; receiving at least one or a plurality of interstitial electrodes within a number of cells of the structure, the interstitial electrodes being a counter electrode to the structural electrode layer and being connectable to the second terminal; and providing a separator disposed between the structural electrode and the interstitial electrodes to serve as an insulator between the structural electrode layer and the interstitial electrodes.

An advantage of the present invention is that it provides a battery designed to meet the need of compact equipment. Further, it provides an efficient battery assembly, eliminating the voids that occur with the assembly of conventional batteries.

Another advantage of the present invention is that it will have numerous applications for weight sensitive systems that utilize stored power. They include, as a non-exhaustive list, consumer goods, portable computers, communication devices, robotic, and air, land and sea vehicles.

Still yet, the present invention provides an opportunity to remove structural constraints in favor of shape selection on a more versatile and aesthetic bases.

These and other objects, along with advantages and features of the invention disclosed herein, will be made more apparent from the description, drawings and claims that follow.

BRIEF DESCRIPTION OF THE DRAWINGS

The foregoing and other objects, features and advantages of the present invention, as well as the invention itself, will be more fully understood from the following description of preferred embodiments, when read together with the accompanying drawings, in which.

DETAILED DESCRIPTION OF THE INVENTION

Figure 1A:
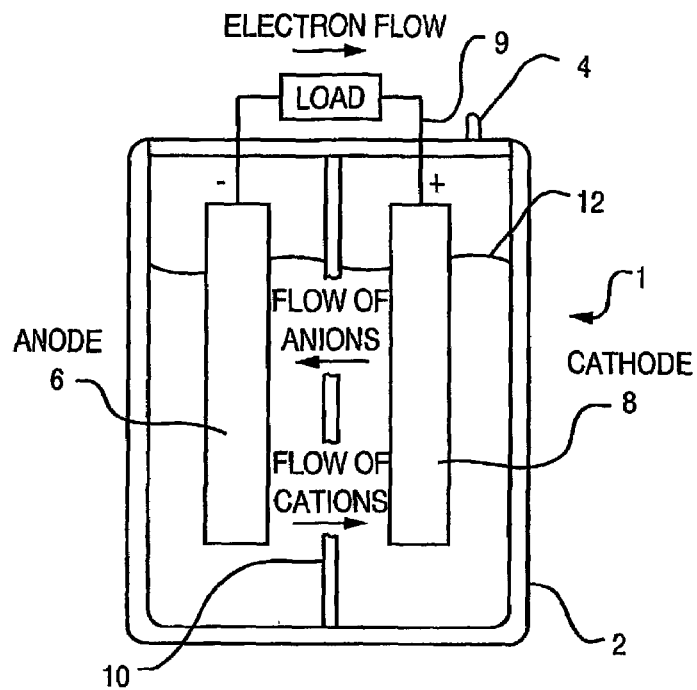
FIGS. 1A–1B schematically show the operation of a battery cell during discharge and charge, respectively.
Figure 1B:
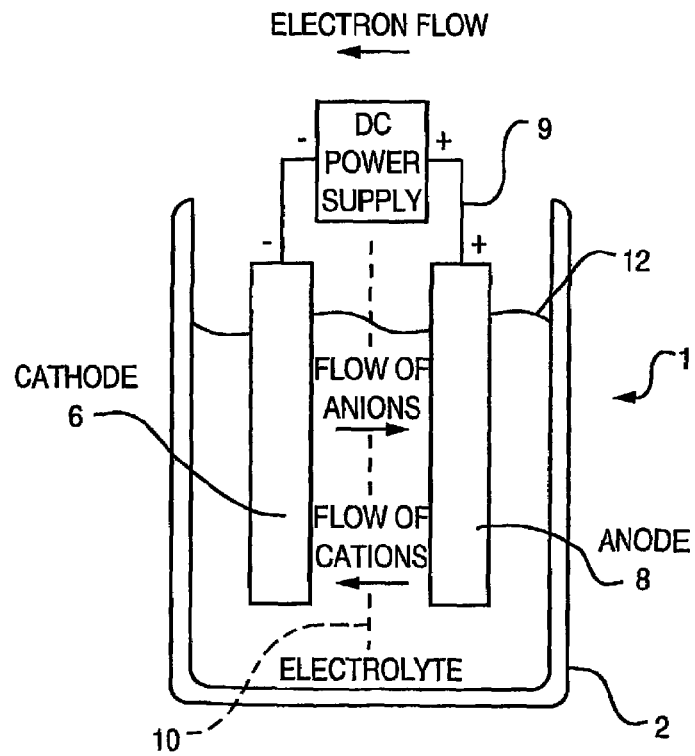
Figure 2A:
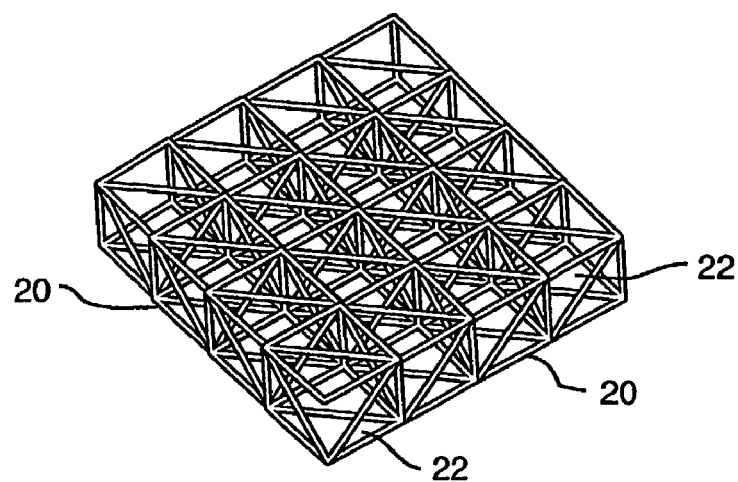
FIGS. 2A–2G schematically shows the fabrication of a preferred embodiment of the present invention open cell interconnected battery structure.

FIGS. 2A–2G are a schematic representation of fabricating a preferred embodiment of the present invention. FIG. 2A shows an open cell interconnected structure 20 comprised of a plurality of open cells 22. The open cell interconnected structure 20, such as a metal lattice, may be hollow or solid and fabricated in various ways including the cellular interconnected networks as taught in PCT Application Nos. PCT/US01/17363, filed May 29, 2001, by Sypeck, et al., entitled "Multifunctional Periodic Cellular Solids and the Method of Making thereof" and PCT/US01/22266, filed Jul. 16, 2001, by Wadley, et al., entitled "Method and Apparatus for Heat Exchange Using Hollow Foams and Interconnected Networks and Method of Making the Same" both of which are hereby incorporated by reference in their entirety herein. In particular, Sypeck PCT/US01/17363 provides various periodic cellular structures that may be utilized for the present invention. Moreover, Wadley PCT/US01/22266 provides various solid foam, hollow ligament foams, or interconnected networks that may be utilized for the present invention. The various interconnected networks, such as periodic cellular and truss structures, corrugated structures, and other structures disclosed herein may be produced using the methods and devices provided in Sypeck PCT/US01/17363 and Wadley PCT/US01/22266.

Figure 2B:
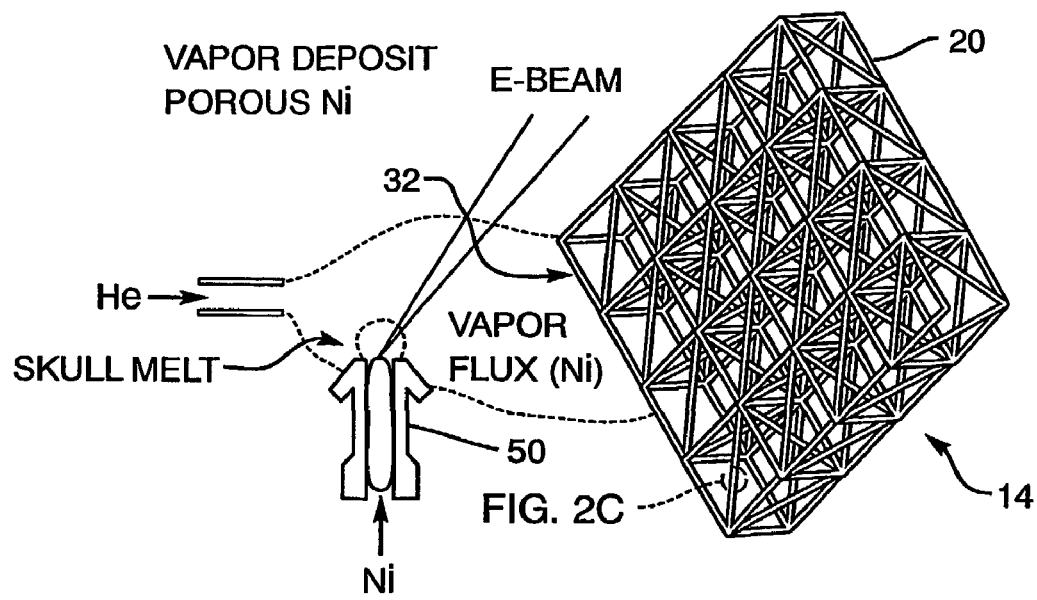
Figure 2C:
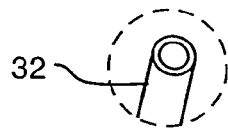
Figure 5A:
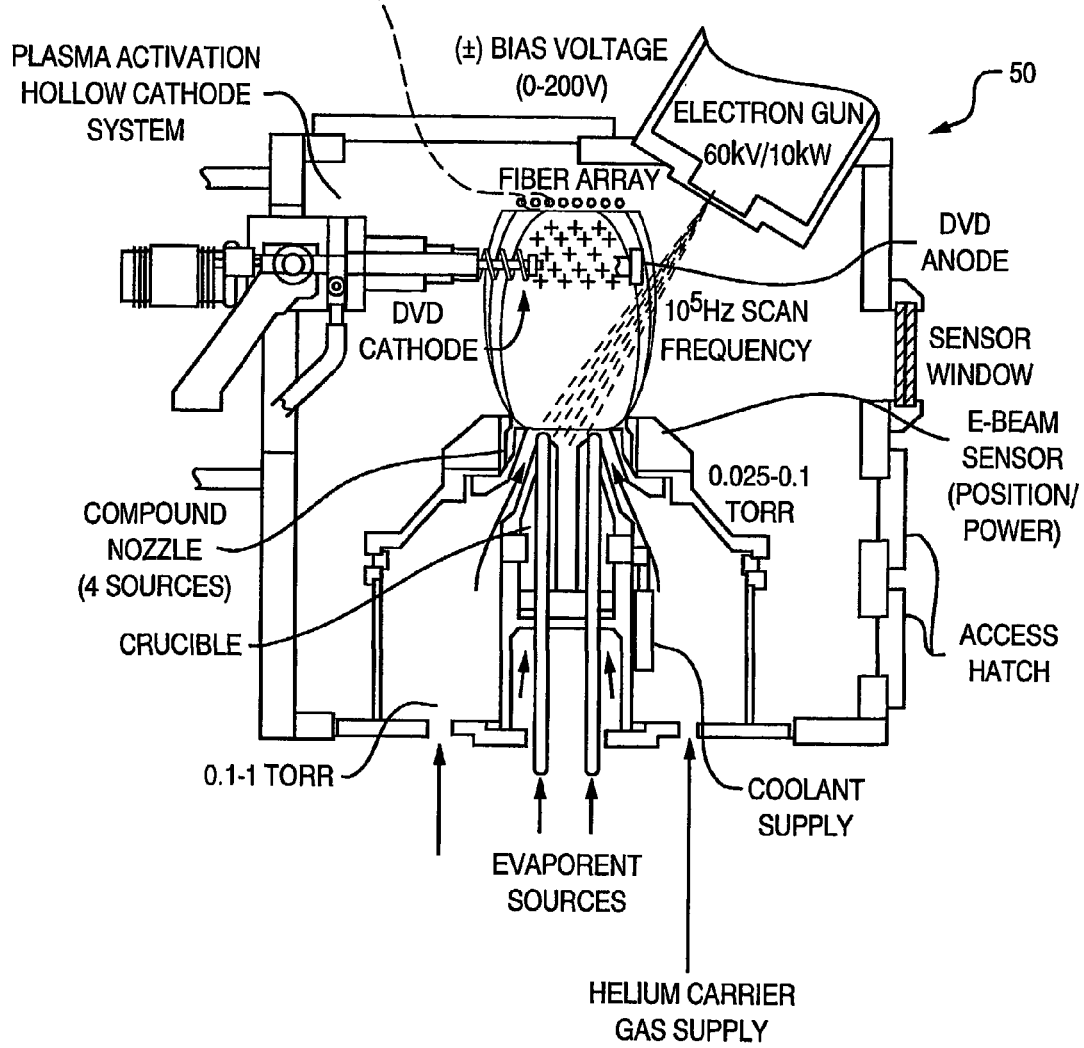
FIG. 5A is a schematic depiction of a directed vapor deposition (DVD) apparatus.
Figure 5B:
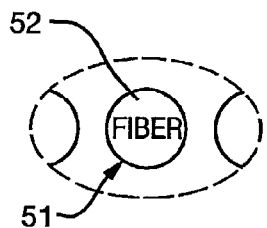
FIGS. 5B–5C show a side view and an exploded view, respectively, of a schematic representation of a segment of a present invention structural cathode and anode with related coatings on a structure/substrate.

Referring to FIGS. 2B–2C, the open cell interconnected structure 20 has a nickel layer 32 deposited or coated thereon using, for example, a directed vapor deposition (DVD) apparatus as shown in FIGS. 5A–5B.

A number of physical vapor deposition processes (PVD), chemical vapor deposition (CVD) processes, and slurry coating (dipping) processes may be used to coat the structure 20 (template) with a nickel material or an appropriate coating material. However, a vast majority of these types of conventional processes have difficulty uniformly coating and penetrating the smaller, dense, or complicated structures.

One preferred method of coating such foams in these instances is by using a directed vapor deposition (DVD) apparatus, as shown in FIGS. 5A–5B, of which is taught in U.S. Pat. No. 5,534,314 to Wadley et al., entitled "Directed Vapor Deposition of Electron Beam Evaporant" and further taught in PCT Application No. PCT/US01/16693, filed May 23, 2001, by Wadley et al., entitled "A Process and Apparatus for Plasma Activated Deposition in a Vacuum" both of which are hereby incorporated by reference in their entirety herein. The combination of operating pressure of the DVD system and collisions between the coating material and the DVD carrier gas stream, inter alia, result in nearly uniform coating of the open cell interconnected structure, front and back, even those near the center of the structure.

Moreover, other process conditions for deposition can be been identified. In fact there is some evidence that a low velocity gas jet achievable with upstream to downstream pressures close to unity may be preferred. Such conditions might be achievable using a different process than DVD, for example, thermal evaporation of a material in a high-pressure environment with strong pumping. This would create a flow through the foam that might entrain the vapor and lead to deposition.

Thereafter, a cathode metal active layer (not shown), nickel hydroxide ($Ni(OH)_2$), is deposited or coated onto or embedded therein the nickel layer 32 of the open cell interconnected structure 20, thereby providing a structural cathode 14 having significant load bearing properties.

Figure 2D:
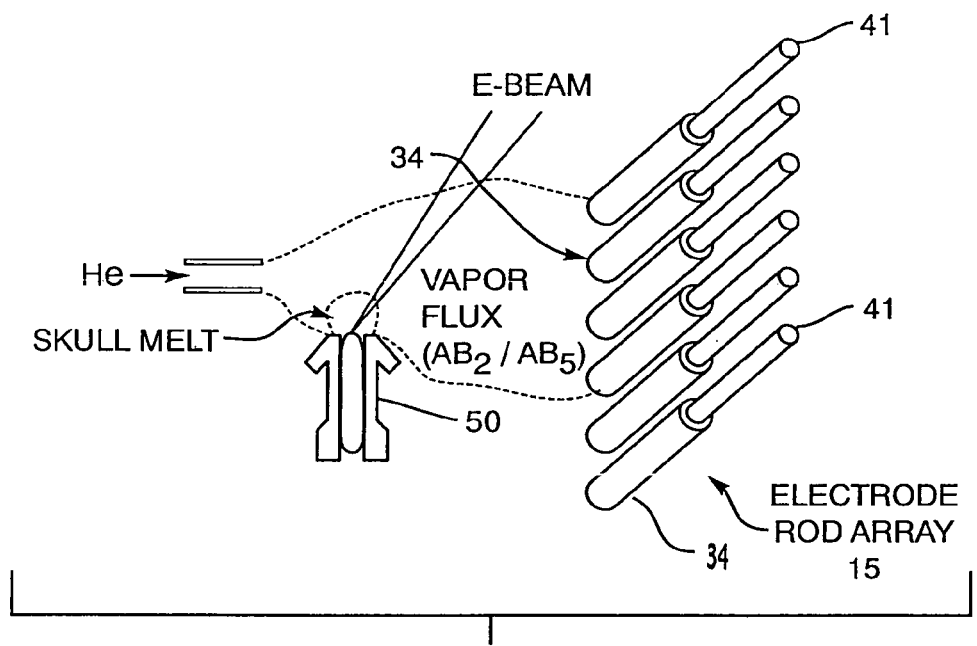

FIG. 2D schematically shows various substrate members 41 having a nickel layer deposited thereon or embedded therein. Next, a directed vapor deposition (DVD) apparatus 50 or the like, is utilized to deposit or coat an anode active metal layer 34, such as $AB_2$ or $AB_5$ alloy, onto or within the nickel layer, thereby forming the interstitial anode 15. Some non-limiting examples of $AB_2$ include Ni, Cr, Mn, V, Ti, Zr, Co, and Fe, and $AB_5$ include Al, Sn, Mn, Co, Cu, Si, Cr, Ce, Nd, Ti, La, and Ni.

Preferred embodiments of the substrate member 41 may include, but not limited thereto, sintered powder, open-cell foams, and compressed fiber mats. The substrate member 41 may be of a variety shapes and sizes suitable for compatibility to the open cells 22 or the contours of the structural cathode 14 (or anode designs).

Figure 2E:
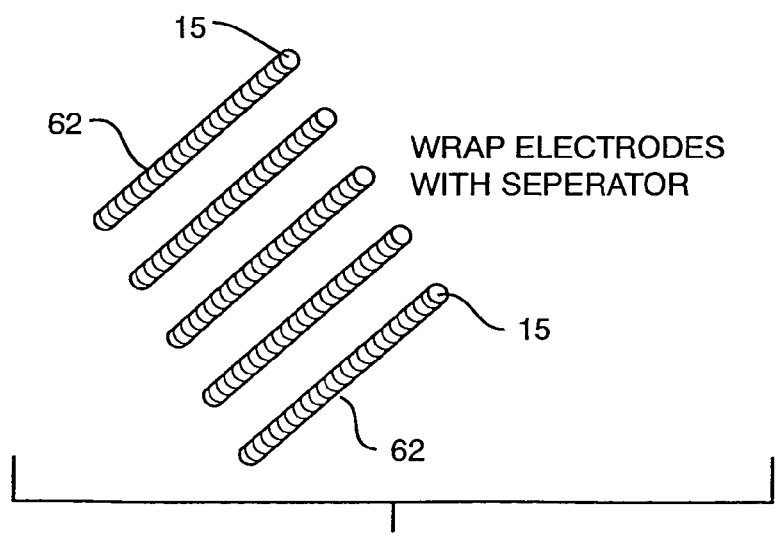

FIG. 2E schematically shows the interstitial anode 15 having a separator layer 62 wrapped or deposited onto or therein. Preferred separator materials may include, but not limited thereto, polymeric film (e.g., polyamide), non-woven polypropylene (e.g., P12 pellon), and micro-porous polypropylene (e.g., celgard 3401).

Figure 2F:
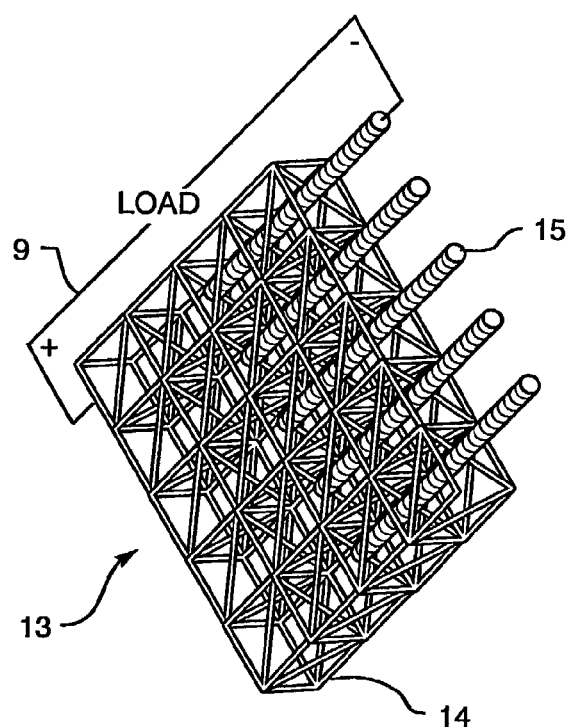

FIG. 2F schematically shows the interstitial anodes 15 being inserted into the structural cathode 14, which in turn are connected to a electrical circuit 9 in a manner known to those skilled in the art, thereby providing the present invention battery. It is important to appreciate that the various steps relied upon herein may be performed in alternative order or in-part simultaneously.

Figure 2G:
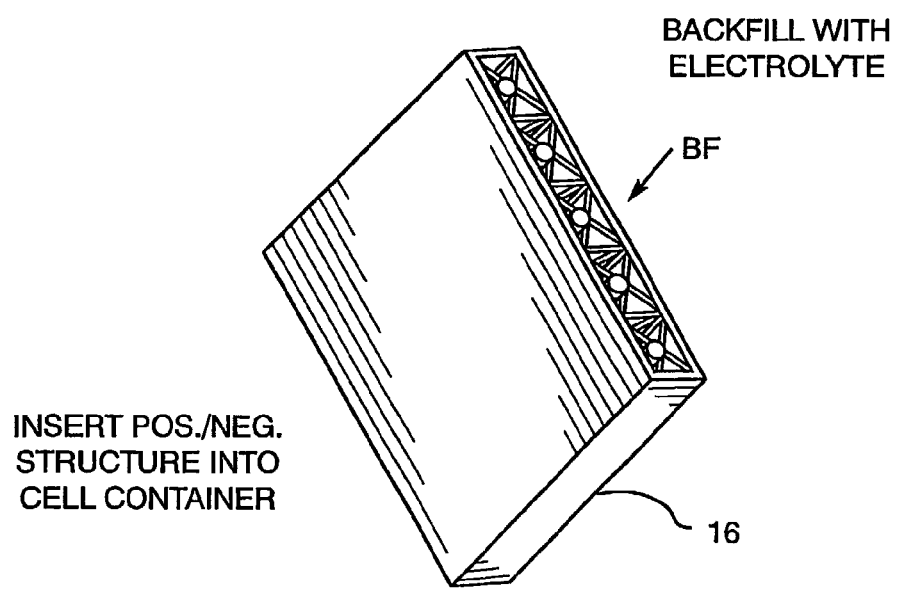

Next, as shown in FIG. 2G, an electrolyte solution, such as KOH, is back filled (indicated by arrow BF) into the battery containment 16 so as to wet the separator 62.

Figure 3A:
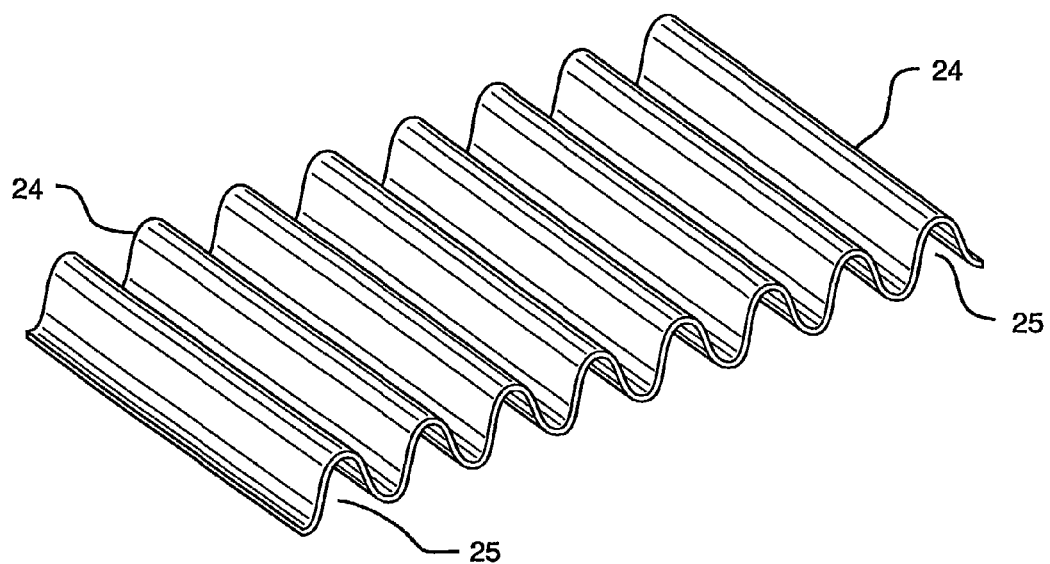
FIGS. 3A–3B schematically show a second preferred embodiment of the present invention having a corrugated battery structure.
Figure 3B:
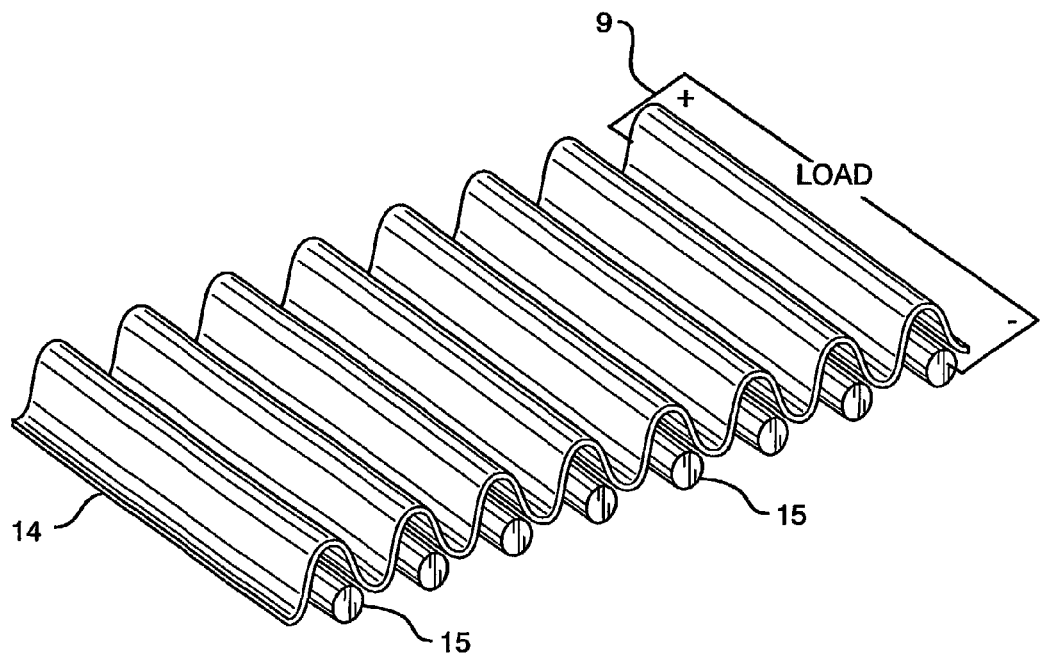

Alternatively, referring to FIGS. 3A–3B, a second preferred embodiment is shown wherein a corrugated (sinusoidal-like) structure 24 having grooves 25 may be utilized to form the structural cathode 14 that receives the interstitial anode 15 using the similar processes described in FIGS. 2A–2D. This corrugated structure is essentially a linear type structure, such as a prismatic battery. Variation of core structures for this linear type core structure are possible, such as triangulated, hexagonal, and interlocked sinusoidal. One skilled in the art would appreciate that further variations of the embodiment and method disclosed in FIGS. 2A–2G are possible. For instance, the anode and cathode are interchanged. Accordingly, the anode is fabricated using the interconnect structure thereby providing a structural anode and the cathode is fabricated using the substrate members thereby providing an interstitial cathode.

Figure 4A:
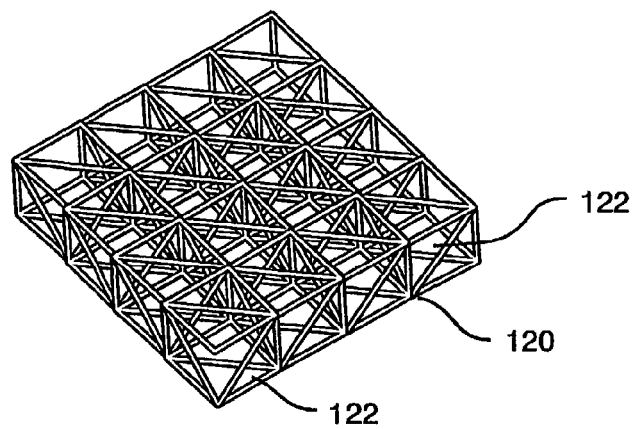
FIGS. 4A–4I schematically show the fabrication of a third embodiment of the present invention open cell interconnected battery structure.
Figure 4B:
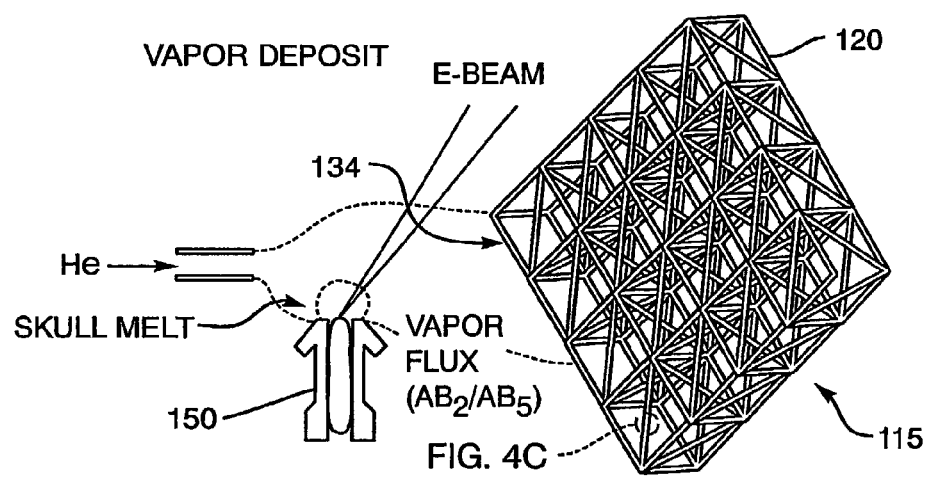
Figure 4C:
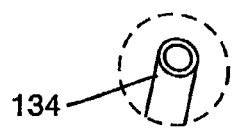

FIGS. 4A–4I is a schematic representation of fabricating a third preferred embodiment of the present invention wherein the structural anode 115 has a separator layer 162 and structural cathode 114 deposited thereon. Referring to FIG. 4A, an open cell interconnected structure 120 comprises nickel material and includes a plurality of open cells 122. As shown in FIG. 4B, an anode active metal layer 134 is deposited or coated onto, or embedded therein the nickel coated structure thereby providing a structural anode 115 having significant load bearing properties.

Figure 4D:
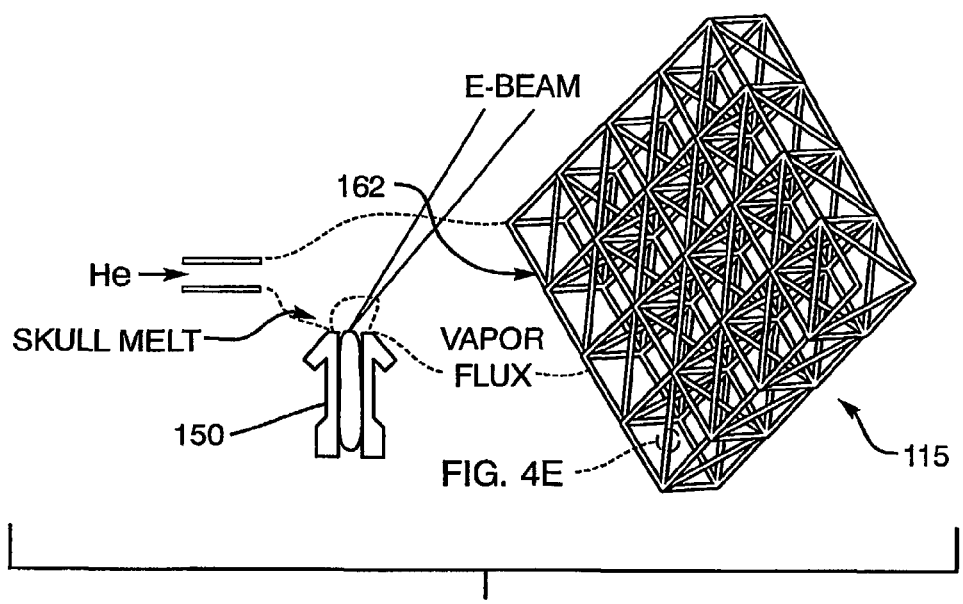
Figure 4E:

Turning to FIGS. 4D–4E, there is shown schematically a separator layer 162 that is deposited onto the structural anode 115.

Figure 4F:
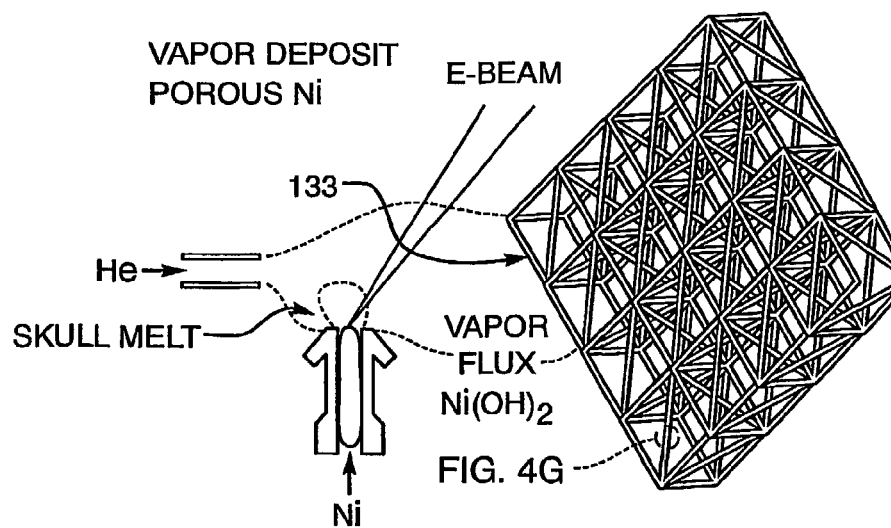
Figure 4G:
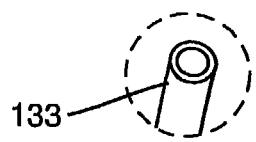
Figure 4H:
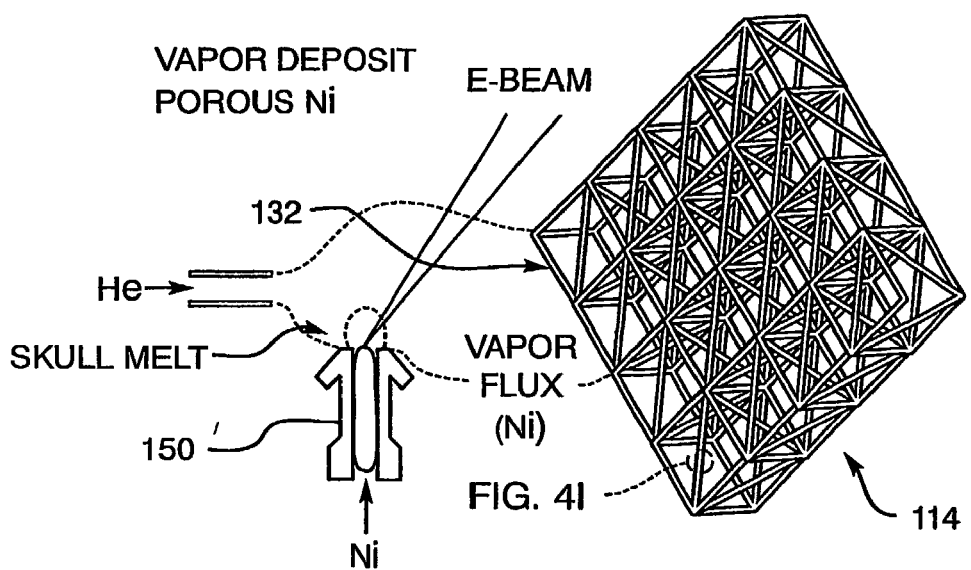
Figure 4I:
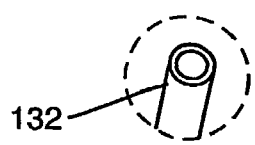

In addition, referring to FIGS. 4F–4G, a cathode metal active layer 133, nickel hydroxide ($Ni(OH)_2$), is deposited or coated onto or within the separator 162. Finally, referring to FIGS. 4H–4I, a nickel layer 132 is deposited or coated onto or embedded therein the cathode active metal layer 133 to provide a structural cathode 114. In a preferred embodiment, the deposition is accomplished by, for example, a directed vapor deposition (DVD) apparatus as shown in FIGS. 5A–5B.

Figure 5C:
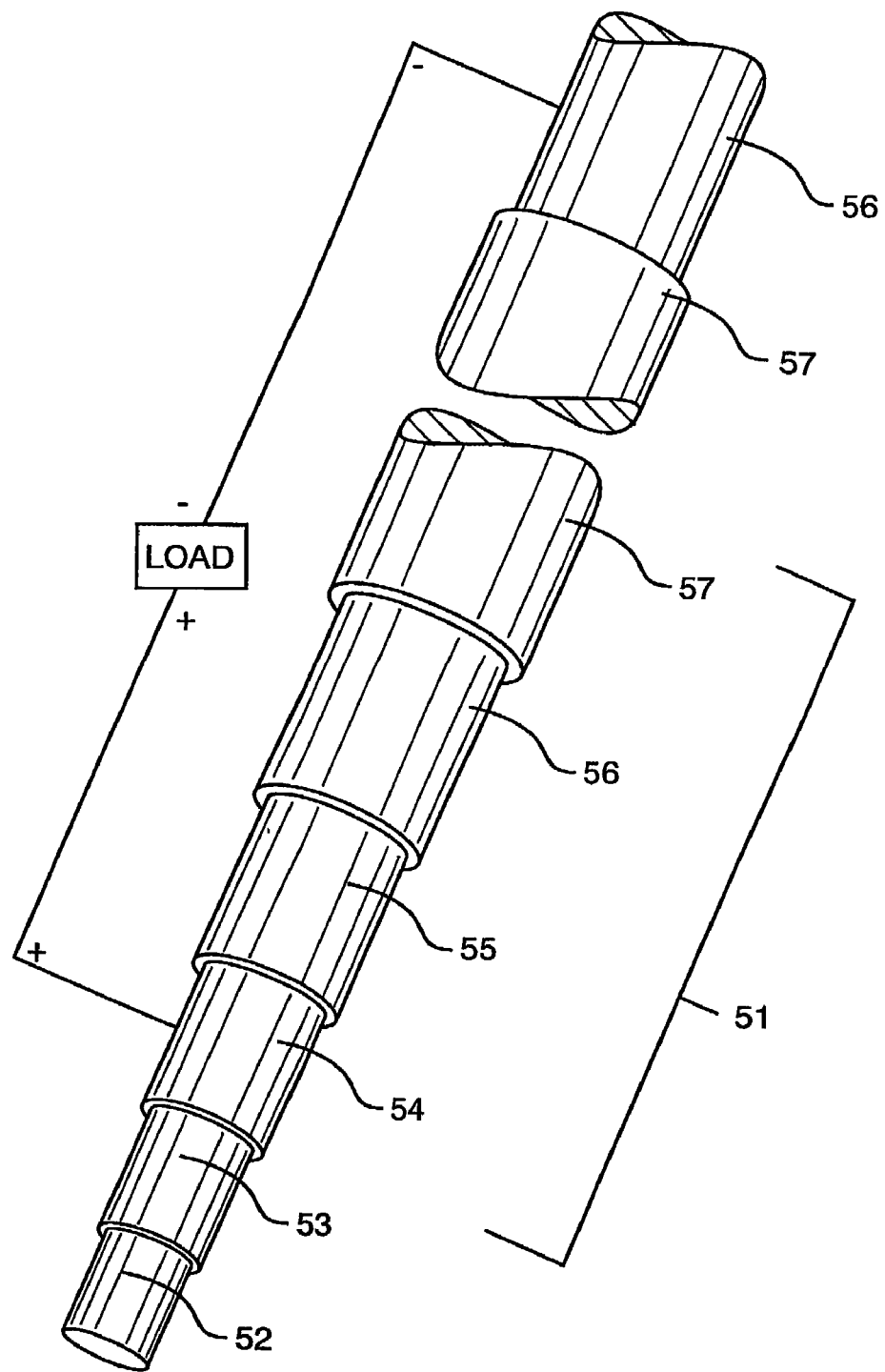

FIG. 5C schematically shows an exploded view of a segment of a present invention structural cathode and anode having a coating layer 51 on a structure (such as a lattice) 52. The coating comprises a metal contact 53, cathode active metal 54, separator 55,; anode active metal 56, and an optional surface protection layer 57. One skilled in the art would appreciate that further variations of the embodiment and method disclosed in FIGS. 4A–4I are possible. For instance, the anode and cathode are interchanged. Accordingly, the cathode is fabricated using the interconnect structure thereby providing a structural cathode and the anode is fabricated on top of the separator and cathode thereby providing a structural anode as the top or outer layer.

It has been shown above in FIGS. 2A–2G, 3A–3B, 4A–4I, and 5C that the cathode and anode have been disposed (i.e., deposited, coated, embedded, impregnated, pasted) onto the interconnected structure (e.g. lattice or corrugation) or substrate, or disposed proximately to the structure/substrate having other layer or layers there between. Moreover, as a fourth preferred embodiment, it is further contemplated that an insulator layer may additionally be disposed (i.e., deposited, coated, embedded, impregnated, pasted) onto the interconnected structure or substrate prior to applying any of the anodes or cathodes. Similarly, this insulating layer or layers may be disposed proximately to the structure/substrate having other layer or layers there between.

Figure 6A:
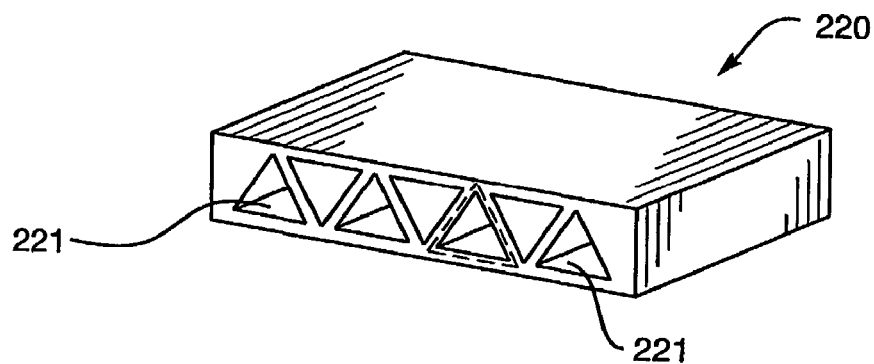
FIGS. 6A–6B is a schematic representation of a fifth preferred embodiment of the present invention wherein a prismatic cell includes multiple channels
Figure 6B:
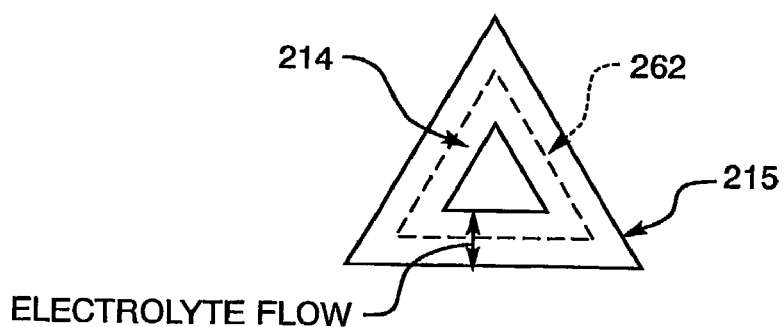

FIGS. 6A–6B is a schematic representation of a fifth preferred embodiment of the present invention wherein a prismatic cell 220 includes multiple channels 221. The multiple channels 221 form a truss structure wherein each channel comprises a structural cathode layer 214, packed with active metals, and a separator layer 262 formed or positioned thereon. Also, a structural anode layer 215, with active metals integrally therein, is formed or positioned on the separator layer 262. Alternatively, the cathode layer 214 and the anode layer 215 are interchanged with respect to one another. In place of the channels 221 having triangular-shaped cross-sections as shown, other shapes may be utilized. For instance the channel cross sections may include the following shapes, but not limited thereto: cylindrical, rectangular, parabolic, pyramid, trapezoidal, conical, etc. This particular embodiment would be convenient for placing the various battery cells in parallel, yet series is also contemplated.

Figure 6C:
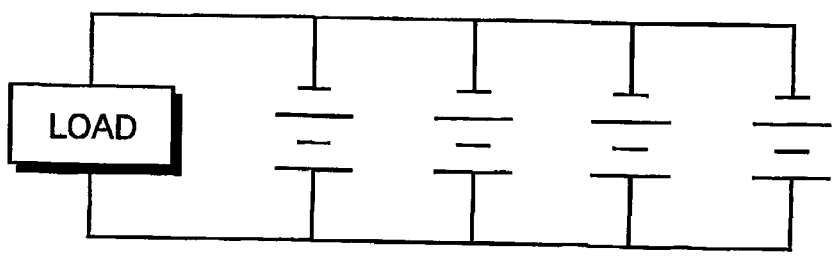
FIG. 6C shows a simplified circuit diagram of the four battery cells of FIG. 6A placed in parallel with the load.

FIG. 6C shows a simplified circuit diagram of four battery cells of FIG. 6A placed in parallel with the load. Any number of battery cells may be utilized, as well as a combination of series and parallel circuits.

Figure 7A:
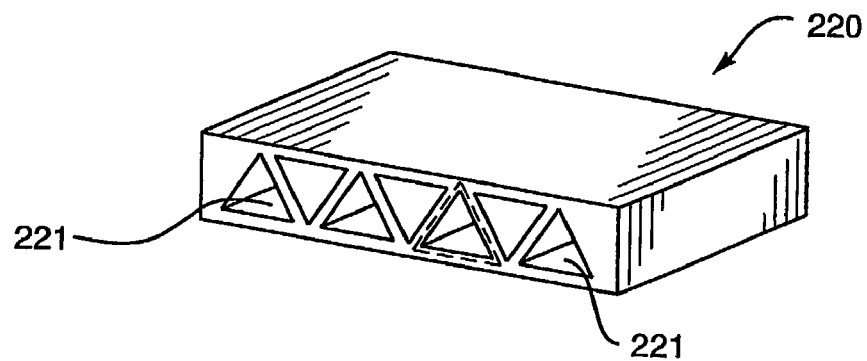
FIGS. 7A–7B show a schematic representation of a sixth preferred embodiment of the present invention wherein a prismatic cell includes multiple channels having insulated electrodes.
Figure 7B:
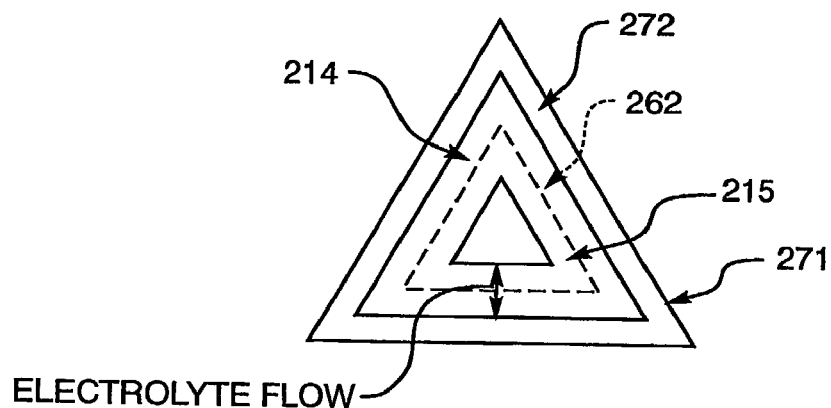

FIGS. 7A–7B is a schematic representation of a sixth preferred embodiment of the present invention wherein a prismatic cell 220 includes multiple channels 221. The multiple channels 221 form a truss structure 271 wherein each channel comprises a structural anode layer 215, packed with active metals $AB_2$, $AB_5$, or similar alloys along with a separator layer 262 formed or positioned thereon. Also, a structural cathode layer 214, with active metals integrally packed therein, is formed or positioned on the separator layer 262. In addition, an insulating/isolation layer 272 is provided between the cathode/anode and the truss structure 272. Alternatively, the cathode layer 214 and the anode layer 215 could be interchanged with respect to one another. This present embodiment would be convenient for placing the various battery cells in series, yet parallel is also contemplated.

Figure 7C:
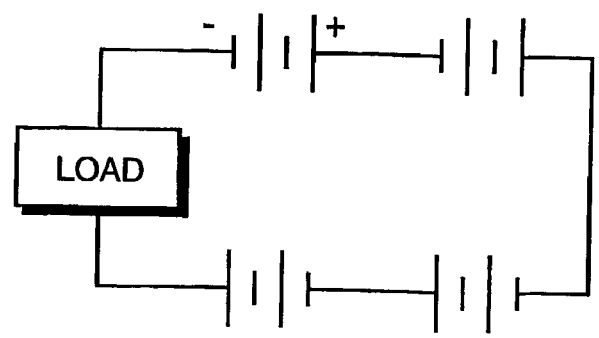
FIG. 7C shows a simplified circuit diagram of the four battery cells of FIG. 7A placed in series with the load.

FIG. 7C shows a simplified circuit diagram of four battery cells of FIG. 7A placed in series with the load. Any number of battery cells may be utilized, as well as a combination of series and parallel circuits.

As a seventh embodiment, the present invention multifunctional battery structures, and methods of producing the same, as discussed above and claimed herein, may be applied to lithium cells (batteries) technology as well. For illustrations of lithium cells See D. Linden, "*Handbook of Batteries*," $2^{nd}$ edition, McGraw-Hill, Inc., New York, (1995), of which is hereby incorporated by reference herein. Lithium metal is attractive as a battery anode material because of its lightweight, high voltage, high electrochemical equivalence, and good conductivity. Because of these outstanding features, the use of lithium has predominated in the development of high-performance primary and secondary batteries during the last decade.

Primary cells using lithium anodes have many advantages over conventional batteries. The advantageous features include the following: high voltage; high energy density; operation over a wide temperature range; good power density; flat discharge characteristics; and superior shelf life.

Lithium cells use nonaqueous solvents for the electrolyte because of the reactivity of lithium in aqueous solutions. Many different materials were considered for the active cathode material; sulfur dioxide, manganese dioxide, iron disulfide, and carbon monofluoride, as well as others known to those skilled in the art. The term "lithium cell," therefore, applies to many different types of cells or chemistries, each using lithium as the anode but differing in cathode material, electrolyte, and chemistry as well as in design and other physical and mechanical features.

Lithium primary cells can be classified into several categories, based on the type of electrolyte (or solvent) and cathode material used. These classifications include, for example, soluble-cathode cells, solid-cathode cells, and solid-electrolyte cells.

A number of inorganic materials have been examined for use as the cathode in primary lithium batteries. The critical requirements for this material to achieve high performance are high battery voltage, high energy density, and compatibility with the electrolyte (that is, being essentially nonreactive or insoluble in the electrolyte). Preferably the cathode material should be conductive, although there are few such materials available, and solid cathode materials are usually mixed with a conducting material, such as graphite, and applied to a conductive grid to provide the needed conductivity. If the cathode reaction products are a metal and a soluble salt (of the anode metal), this feature can improve cathode conductivity as the discharge proceeds.

The reactivity of lithium in aqueous solutions requires the use of nonaqueous electrolytes for lithium anode batteries. Polar organic liquids are the most common electrolyte solvents for the active primary cells, except for the thionyl chloride ($SOCl_2$) and sulfuryl chloride ($SO_2Cl_2$) cells, where these inorganic compounds serve as both the solvent and the active cathode material.

The mechanism for the discharge of the lithium anode is the oxidation of lithium to form lithium ions ($Li^-$) with the release of an electron, $$Li \rightarrow Li^- + e$$

The electron moves through the external circuit to the cathode, where it reacts with the cathode material, which is reduced. At the same time the $Li^+$ ion, which is small and mobile in both liquid and solid-state electrolytes, moves through the electrolyte to the cathode, where it reacts to form a lithium compound.

An advantage of the present invention, among other things, is that it provides a battery system designed to meet the need of compact equipment.

Another advantage of the present invention is that it fulfills the need in the art in response to the growing demand for small rechargeable consumer batteries. Applications include, but are not limited thereto, power tools, portable telephones, lap top computers, camcorders, digital cameras and emergency lighting systems; as well as emerging transportation technologies for hybrid electric vehicle applications.

Further, the present invention battery system provides structural integrity and versatility, and aesthetic versatility, while maximizing power output of the cells, and minimizing the overall weight of the structure.

The invention may be embodied in other specific forms without departing from the spirit or essential characteristics thereof. The foregoing embodiments are therefore to be considered in all respects illustrative rather than limiting of the invention described herein. Scope of the invention is this indicated by the appended claims rather than by the foregoing description, and all changes which come within the meaning and range of equivalency of the claims are therefore intended to be embraced herein.

We claim:

1. A multifunctional battery for supplying power to an electrical circuit having a first terminal and a second terminal, said battery comprising:

an open cell interconnected structure comprised of a plurality of open cells, wherein said structure comprises a structural electrode, said structure being configured to be a load bearing member and connected to the first terminal;

at least one interstitial electrode, said interstitial electrodes being a counter electrode to said structural electrode, said interstitial electrode being at least partially received within said plurality of open cells of said structure and connected to the second terminal;

wherein said structural electrode and said interstitial electrode are counter electrodes with respect to one another, wherein:

if said structural electrode is a cathode then said interstitial electrode is an anode; or alternatively, if said structural electrode is an anode then said interstitial electrode is a cathode;

said cathode comprises:

a cathode nickel layer, and a cathode active metal disposed on said cathode nickel layer;

said anode comprises:
an anode nickel layer, and
an anode active metal disposed on said anode nickel layer; and
a separator portion disposed between said structural electrode and said interstitial electrodes to serve as an electrical insulator between said structural electrode and interstitial electrodes.

2. The battery of claim 1, wherein:
said cathode active metal further comprises nickel-hydroxide; and
said anode active metal further comprises metal-hydride.

3. The battery of claim 2, wherein the metal-hydride comprises an $AB_2$ or $AB_5$ alloy.

4. The battery of claim 3, wherein said $AB_2$ alloy is at least two selected from the group consisting of Ni, Cr, Mn, V, Ti, Zr, Co, and Fe.

5. The battery of claim 3, wherein said $AB_5$ alloy is at least two selected from the group consisting of Al, Sn, Mn, Co, Cu, Si, Cr, Ce, Nd, Ti, La, and Ni.

6. The battery of claim 1, wherein said separator comprises an electrolyte material.

7. The battery of claim 1, wherein said open cell interconnected structure comprises a truss structure.

8. The battery of claim 1, wherein said open cell interconnected structure comprise a plurality of truss structures stacked upon one another.

9. The battery of claim 1, wherein said open cell interconnected structure comprises a cellular structure.

10. The battery of claim 1, wherein said open cell interconnected structure comprise a plurality of cellular structures stacked upon one another.

11. The battery of claim 9, wherein said cellular structure being comprised of woven material.

12. The battery of claim 9, wherein said cellular structure being comprised of textile layers.

13. The battery of claim 12, wherein at least some of said textile layers are a structure selected from the group consisting of woven mesh, square woven mesh, braid mesh, triaxial mesh, and quasi-triaxial mesh.

14. The method of claim 12, wherein said textile layers are three-dimensional elements.

15. The battery of claim 14, wherein at least some of said three dimensional textile layers are a structure selected from the group consisting of braided, multiply, triaxial, multi axial, H-beam, I-beam, and honeycomb.

16. A method of producing a multifunctional battery for supplying power to an electrical circuit having a first terminal and a second terminal, said battery comprising:
providing an open cell interconnected structure comprised of a plurality of open cells, wherein said structure comprises a structural electrode, said structure being configured to be a load bearing member and being connectable to the first terminal;
receiving at least one or a plurality of interstitial electrodes within a number of cells of said structure, said interstitial electrodes being a counter electrode to said structural electrode layer and being connectable to the second terminal;
providing a separator disposed between said structural electrode and said interstitial electrodes to serve as an insulator between said structural electrode layer and said interstitial electrodes, wherein:
if said structural electrode is a cathode and said interstitial electrodes are anodes; then:
said cathode is produced by a method comprising:
depositing a cathode nickel layer on said structure;
providing a cathode active metal on said cathode nickel layer;
said anodes are produced by a method comprising:
providing a member configured for said interstitial electrode having an anode nickel layer disposed thereon, and
depositing an anode active metal on said anode nickel layer, and alternatively, if said structural electrode is an anode and said interstitial electrodes are cathodes; then
said cathodes are produced by a method comprising:
depositing a cathode nickel layer on a member configured for said interstitial electrode;
providing a cathode active metal on said cathode nickel layer;
said anode is produced by a method comprising:
providing said structure having an anode nickel layer disposed thereon, and
depositing an anode active metal on said anode nickel layer.

17. The method of claim 16, wherein said deposition of said cathode nickel layer is applied to said structure or said member by means of a vapor deposition process.

18. The method of claim 17, wherein said deposition process utilizes a carrier gas stream to direct the material vapor.

19. The method of claim 17, wherein said deposition process is directed vapor deposition.

20. The method of claim 16, wherein said deposition of said cathode nickel layer is applied to said structure or said member by a process selected from the group consisting of PVD, CVD, high pressure thermal evaporation, dipping, and high pressure sputtering.

21. The method of claim 16, wherein said deposition of said anode active metal is applied to said anode nickel layer by means of a vapor deposition process.

22. The method of claim 21, wherein said deposition process utilizes a carrier gas stream to direct the material vapor.

23. The method of claim 21, wherein said deposition process is directed vapor deposition.

24. The method of claim 16, wherein said deposition of said anode active metal is applied to said anode nickel layer by a process selected from the group consisting of PVD, CVD, high pressure thermal evaporation, dipping, and high pressure sputtering.

25. The method of claim 16, wherein:
said cathode active metal comprises nickel-hydroxide; and
said anode active metal comprises metal-hydride.

26. The method of claim 25, wherein the metal-hydride further comprises an $AB_2$ or $AB_5$ alloy.

27. The method of claim 26, wherein said $AB_2$ alloy is selected from the group consisting of Ni, Cr, Mn, V, Ti, Zr, Co, and Fe.

28. The method of claim 26, wherein said $AB_5$ alloy is selected from the group consisting of Al, Sn, Mn, Co, Cu, Si, Cr, Ce, Nd, Ti, La, and Ni.

29. The method of claim 16, wherein said separator comprises an electrolyte material.

30. The method of claim 16, wherein said open cell interconnected network comprises a truss structure.

31. The method of claim 24, wherein said open cell interconnected network comprise a plurality of truss structures stacked upon one another.

32. The method of claim 16, wherein said open cell interconnected network comprises a cellular structure.

33. The method of claim 32, wherein said open cell interconnected network comprise a plurality of cellular structures stacked upon one another.

34. The method of claim 32, wherein said cellular structure being comprised of woven material.

35. The method of claim 32, wherein said cellular structure being comprised of textile layers.

36. The method of claim 35, wherein at least some of said textile layers are a structure selected from the group consisting of woven mesh, square woven mesh, braid mesh, triaxial mesh, and quasi-triaxial mesh.

37. The method of claim 35, wherein said textile layers are three-dimensional elements.

38. The method of claim 37, wherein at least some of said three dimensional textile layers are a structure selected from the group consisting of braided, multiply, triaxial, multi axial, H-beam, I-beam, and honeycomb.

* * * * *